(12) United States Patent  (10) Patent No.: US 7,272,537 B2
Mogadam  (45) Date of Patent: Sep. 18, 2007

(54) SPOUT FOR DISPENSING LIQUID FROM A LIQUID CONTAINER

(75) Inventor: Masoud Mike Mogadam, Sunnyvale, CA (US)

(73) Assignee: Capton, Inc., San Francisco, CA (US)

( * ) Notice: Subject to any disclaimer, the term of this patent is extended or adjusted under 35 U.S.C. 154(b) by 0 days.

(21) Appl. No.: 10/845,395

(22) Filed: May 13, 2004

(65) Prior Publication Data

US 2004/0210405 A1   Oct. 21, 2004

Related U.S. Application Data

(62) Division of application No. 10/093,859, filed on Mar. 8, 2002, now Pat. No. 6,892,166.

(60) Provisional application No. 60/274,418, filed on Mar. 9, 2001.

(51) Int. Cl.
    *G06F 19/00* (2006.01)
(52) U.S. Cl. ...................... 702/186; 222/641
(58) Field of Classification Search ............ 702/186, 702/182–185, 188; 222/1, 24, 641
    See application file for complete search history.

(56) References Cited

U.S. PATENT DOCUMENTS

| | | |
|---|---|---|
| 3,170,597 A | 2/1965 | Reichenberger |
| 3,920,149 A | 11/1975 | Fortino et al. |
| 4,278,186 A | 7/1981 | Williamson |
| 4,433,795 A | 2/1984 | Maiefski et al. |
| 5,255,819 A * | 10/1993 | Peckels .................... 222/1 |
| 5,505,349 A | 4/1996 | Peckels |
| 6,036,055 A | 3/2000 | Mogadam et al. |

FOREIGN PATENT DOCUMENTS

| | | |
|---|---|---|
| EP | 0726225 B1 | 8/1996 |
| GR | 1003514 B | 1/2001 |

OTHER PUBLICATIONS

International Search Report, Oct. 30, 2002.

* cited by examiner

*Primary Examiner*—Edward Raymond
(74) *Attorney, Agent, or Firm*—Adeli Law Group PLC (57) ABSTRACT

Some embodiments of the invention provide a system for monitoring liquid consumption at one or more establishments. At each establishment, the system includes one or more spouts and a local computer. Each spout is mounted on a liquid container. Also, each spout generates data regarding the amount of liquid poured from the spout's container. The local computer at each establishment collects data generated by the spouts at the establishment. In some embodiments, a wireless network links the local computer and the spouts at each establishment. The system also includes an external computer that gathers the data collected by the local computers of the establishments monitored by the system. In some embodiments, the external computer is located outside of all the establishments, while in other embodiments this computer is located within one of the establishments. Some embodiments of the invention provide a free-pour spout. This spout mounts on an open orifice of a liquid container and measures the amount of liquid poured from the liquid container. This spout has a housing and a passageway defined within the housing. It also has a detection circuit that detects fluid flow through the passageway. In addition, this spout has a measuring circuit that generates data relating to fluid flow when the detection circuit detects fluid flow through the passageway.

32 Claims, 8 Drawing Sheets

FIG. 2C
Front View

FIG. 2G
Top View

FIG. 2B

FIG. 2H
Bottom View

FIG. 2A
Rear View

SPOUT FOR DISPENSING LIQUID FROM A LIQUID CONTAINER

CLAIM OF BENEFIT TO PRIOR APPLICATIONS

This application is a divisional patent application of U.S. patent application Ser. No. 10/093,859 entitled "Method, Apparatus, and System for Monitoring Amount of Liquid Poured from Liquid Containers," filed Mar. 8, 2002 now U.S. Pat. No. 6,892,166, which claims the benefit of the U.S. Provisional Application 60/274,418, filed Mar. 9, 2001. U.S. patent application Ser. No. 10/093,859 is incorporated herein by reference.

FIELD OF THE INVENTION

The invention is directed towards method, apparatus, and system for monitoring amount of liquid poured from liquid containers.

BACKGROUND OF THE INVENTION

The amount of liquids dispensed from liquid containers need to be monitored for many endeavors today. For instance, the management of establishments such as bars and taverns have long found it necessary to carefully monitor the relationship between liquor dispensed and receipts by controlling the quantity of liquor dispensed from a specific bottle and recording the sale.

A few systems have been proposed to date for measuring and recording the amount of liquid dispensed from liquid containers. One such system includes a spout that is configured to attach to an opening of a liquid container. This spout also uses a portion-control mechanism to control the desired amount of liquid poured from the liquid container. The spout includes a radio transmitter for emitting signals containing activity information. A receiver receives the transmitted signals, and provides these signals to a computer at the establishment that processes the signals into text for viewing.

Some establishments have resisted using monitoring systems that utilize portion-control mechanisms since some consumers find such mechanism to be obtrusive. Also, portion-control devices require manual activation and are at times bulky. Hence, there is a need for a compact free-pour apparatus that measures the amount of dispensed liquid in an unobtrusive fashion without requiring manual activation.

There is also a need for a remote monitoring system that allows an administrator to monitor liquid consumption for multiple sites. Ideally, this monitoring system would allow the administrator to monitor liquid consumption from a variety of remote locations. Also, this system ideally would require minimal technical oversight for the hardware and software that collects the data at each establishment.

SUMMARY OF THE INVENTION

Some embodiments of the invention provide a system for monitoring liquid consumption at one or more establishments. At each establishment, the system includes one or more spouts and a local computer. Each spout is mounted on a liquid container. Also, each spout generates data regarding the amount of liquid poured from the spout's container. The local computer at each establishment collects data generated by the spouts at the establishment. In some embodiments, a wireless network links the local computer and the spouts at each establishment. The system also includes an external computer that gathers the data collected by the local computers of the establishments monitored by the system. In some embodiments, the external computer is located outside of all the establishments, while in other embodiments this computer is located within one of the establishments.

In some embodiments, each local computer collects raw data from the spouts and passes this raw data to the external computer, which converts this raw data into the actual amount dispensed from the liquid containers. In other embodiments, a local computer might generate the actual amount dispensed from the liquid container and pass this amount to the external computer. In yet other embodiments, a spout might generate the actual amount dispensed from the liquid container and pass this amount to the local computer.

Some embodiments of the invention provide a free-pour spout. This spout mounts on an open orifice of a liquid container and measures the amount of liquid poured from the liquid container. This spout has a housing and a passageway defined within the housing. It also has a detection circuit that detects fluid flow through the passageway. In addition, this spout has a measuring circuit that generates data relating to fluid flow when the detection circuit detects fluid flow through the passageway.

In some embodiments, the detection circuit includes a motion circuit that detects when the spout is tilted by at least a first angle. In these embodiments, once the motion circuit detects that the spout is tilted by at least the first angle, the measuring circuit generates a time measurement when the spout remains tilted by at least the first angle for a threshold time period. This time measurement represents an estimate of the time that liquid was flowing through the passageway.

Also, in some embodiments, the time measurement is derived from at least two time intervals relating to fluid flow. For instance, some embodiments generate the time measurement as the weighted or unweighted sum of two time intervals relating to fluid flow. In some embodiments, one time interval is a pour-initiation period during which fluid begins to pour through the spout's passageway, and another time interval is a full-pour period during which fluid freely pours through the spout's passageway.

The fluid flow is laminar during the full-pour period. Some embodiments design the spout's passageway to have certain dimensional attributes that ensure laminar fluid flow. For instance, in one embodiment described below, the spout's passageway has a bent cylindrical shape that has a length L (also referred to as height) and a circular cross section with a diameter D, where the ratio of L and D is less than or equal to 20. One of ordinary skill will realize that other embodiments might use different shaped passageways (e.g., might use non-circular cylindrical passageways that have elliptical cross sections or polygonal cross sections). These embodiments could ensure laminar fluid flow similarly by selecting a particular set of dimensions (e.g., selecting a particular height and cross-section size) for the passageway.

In some embodiments, the motion circuit generates a first signal that is active when the spout is tilted by at least the first angle. In some of these embodiments, the motion circuit includes a tilt switch that outputs the first signal. This tilt switch closes when the spout is titled by at least a first angle (e.g., in some embodiments, the coordinate axes of the tilt switch and the spout are aligned, and the tilt switch closes when the spout and tilt switch are tilted by 90°). In these embodiments, the closing of the tilt switch makes the first signal active and the opening of the tilt switch makes the first signal inactive. For instance, in some embodiments, one terminal of the tilt switch connects to the output terminal that supplies the first signal while another terminal of the tilt switch connects to a reference voltage. In these embodiments, (1) the closing of the tilt switch pulls the first signal to the reference voltage, which defines the active state of the first signal, while (2) the opening of the tilt switch causes the charge on the first signal to drain to a ground state, which defines the inactive state of the first signal.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

The invention is directed towards method, apparatus, and system for monitoring amount of liquid poured from liquid containers. In the following description, well-known structures and devices are shown in block diagram form in order not to obscure the description of the invention with unnecessary detail. In other instances, numerous details are set forth for purpose of explanation. However, one of ordinary skill in the art will realize that the invention may be practiced without the use of these specific details. For example, the invention is described below by reference to the Internet, the World Wide Web (WWW) and technology related to the Internet and the WWW. However, the same techniques can easily be applied to other types of electronic information distribution systems. For instance, the invention can be applied to computer networks that use other data communication protocols and/or use next generation Internet protocols.

I. Overall System

Figure 1:
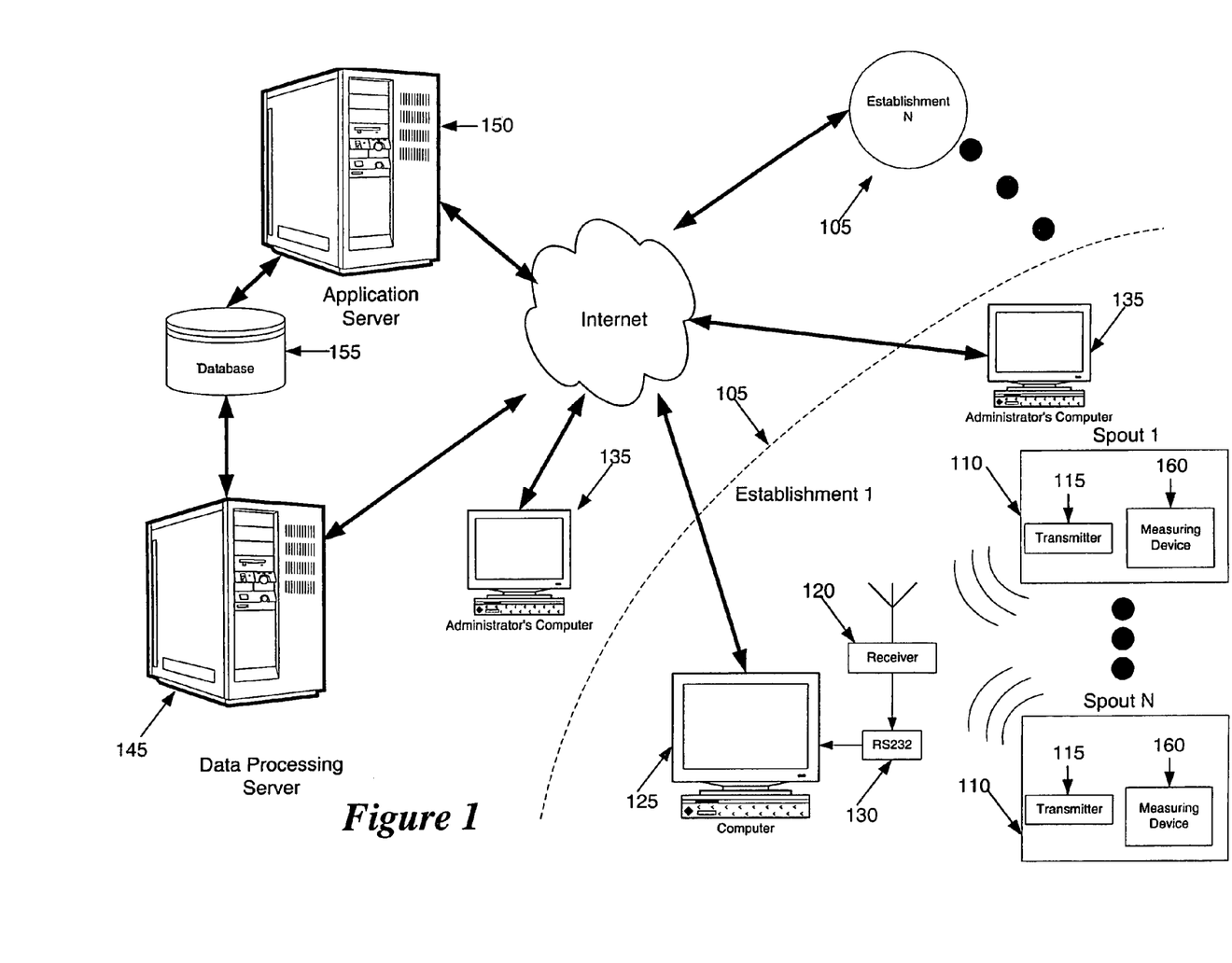
FIG. 1 illustrates a monitoring system according to some embodiments of the invention.
Figure 2A:
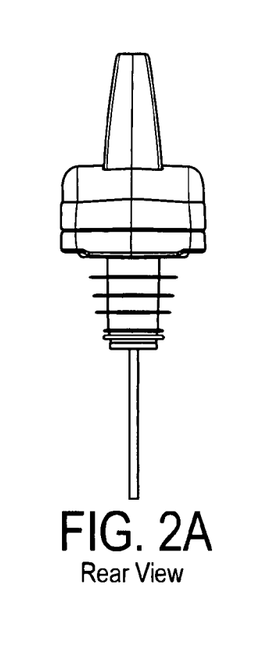
FIGS. 2A–2H present several different views of the exterior contour of a free-pour spout used in some embodiments of the invention.
Figure 2B:
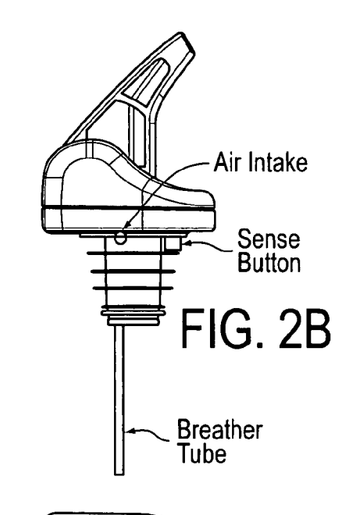
Figure 2C:
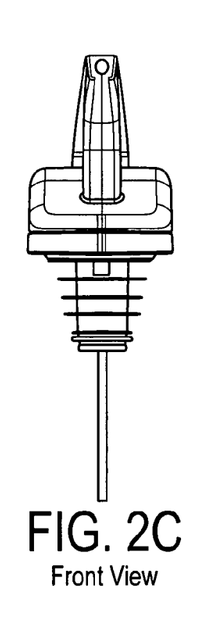
Figure 2D:
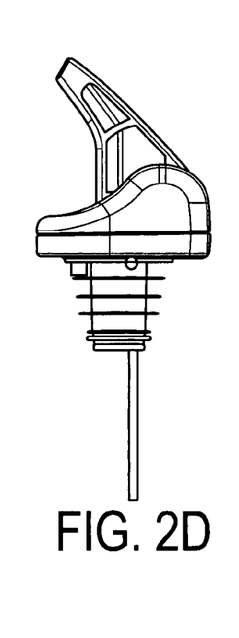
Figure 2E:
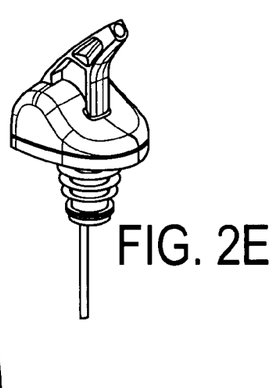
Figure 2F:
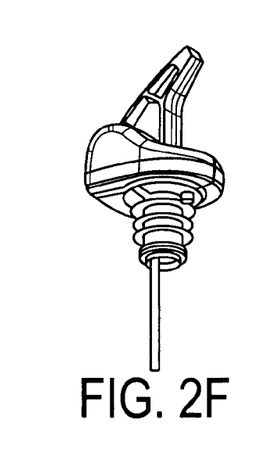
Figure 2G:
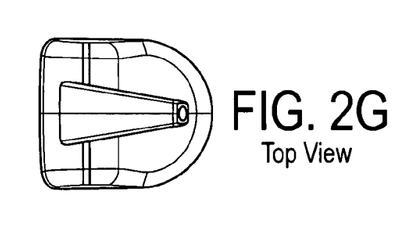
Figure 2H:
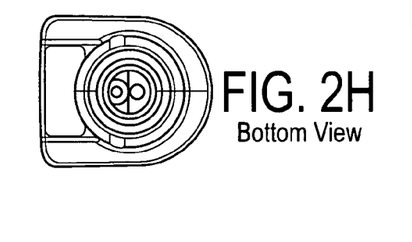

FIG. 1 illustrates a monitoring system 100 according to some embodiments of the invention. This system allows an administrator to monitor liquid consumption at one or more establishments 105 (e.g., one ore more bars or taverns). This system includes several components that are located at each establishment 105 and several components that are located outside of the establishment. At the establishment, the system includes (1) one or more spouts 110 for attaching to openings of liquid containers, (2) a receiver 120, (3) a computer 125 or any other data collection device or appliance, and (4) an RS232 link 130 for communicatively coupling the receiver 120 and computer 125.

The system also includes computers 135 for the administrators of the establishment. As shown in FIG. 1, the administrator computers can be located inside or outside of the establishment. Outside of the establishment 105, the system also includes a data processing server 145, an application server 150, and a database 155. The data processing server and the application server communicatively couple respectively to the local computer 125 and the administrator computers 135 through the Internet.

As further described below by reference to FIGS. 2–4, each spout 110 is configured to attach to an opening of a liquid container. As shown in FIG. 1, each spout includes a transmitter 115 and a measuring apparatus 160. Each spout's measuring apparatus provides data relating to the amount of liquid poured from the container affixed to its spout. In some embodiments, the measuring apparatuses calculate the actual amount of liquid dispensed from their corresponding containers. However, in the embodiments described below, the measuring apparatuses generate raw data relating to the amount of the dispensed liquid; as further described below, the data processing server 145 converts the raw data to the actual amount of the dispensed liquid.

A variety of different measuring apparatuses can be used in conjunction with the present invention. For instance, a spout's measuring apparatus can be an in-line conductive or inductive flow meter, a portion-control mechanism, or a free-pour measurement apparatus. An example of an in-line flow meter that can be used in conjunction with the present invention is Draft Sentinel Beer Monitoring Equipment of Berg Company. U.S. Pat. No. 6,036,055 discloses an electronic spout 110 that has a portion-control mechanism, which can be used in conjunction with the present invention. The disclosure of U.S. Pat. No. 6,036,055 is incorporated herein by reference. Moreover, a novel free-pour measurement apparatus will be described below by reference to FIGS. 2–9.

The data generated by each spout's measurement apparatus is transmitted to the receiver 120 by the spout's transmitter 115. In the embodiments described below, the spout transmitters are radio transmitters that transmit radio signals to a radio receiver 120. Also, in these embodiments, a spout's transmitter transmits an engage signal to the receiver each time its spout is placed on a liquid container, a disengage signal to the receiver each time its spout is removed from the liquid container, and a pour signal each time the spout's measurement apparatus detects a pour.

The transmitter transmits each signal multiple times at random intervals when an event occurs (e.g., an engage, disengage, or pour event occurs), in order to ensure reliable reception. In some embodiments, the signal includes a data packet that contains a serial number, a sequence number, and an event identifier. The serial number provides the identity of a spout, which, as further described below, is assigned (via software) to a particular type of liquid (e.g., to a particular liquor brand) for each establishment or customer. Hence, the serial number is used by the data-processing server to identify the type of liquid stored in the container attached to the spout. The sequence number provides a count of each unique event of each serial-numbered unit, and thereby differentiates the reception of different unique events from the same serial-numbered unit. The event identifier specifies the type of event that has occurred. As mentioned above, the event-types are spout engage, spout disengage, and pour. The pour event can be specified by a variety of raw data. In the free-pour embodiments described below, each pour event is specified by a time-interval that is measured by the measurement apparatus of the spout.

The receiver 120 forwards each packet that it receives from the transmitters 115 to the computer 125 through the RS-232 link, which, in some embodiments, is formed by an RS-232 cable connecting the RS-232 ports of the computer and receiver. As mentioned above, each transmitter transmits each signal multiple times in order to ensure reliable reception. After forwarding a received packet to the computer, the receiver discards the other identical copies of the packet that it receives. In some embodiments, the receiver (1) stores in a table the serial number and sequence number of each packet that it forwards to the computer, and (2) discards the received packets that have serial and sequence numbers that match serial and sequence numbers recorded in the table. The table is a FIFO table; hence, when it fills up, the first entry in the table is deleted in order to record the next entry.

The computer stores the packets that it receives from the receiver in a data file. The computer can be a typical personal computer, workstation, or server. In some embodiments, this computer is a data-collecting "brick" with minimal or no interactions with individuals at the establishment. At pre-specified intervals (e.g., every five minutes), the computer sends through the Internet the data file with the collected packet to the data processing server 145. The transmitted data file identifies the establishment from which the data was collected. In some embodiments, the computer 125 connects to the Internet through a dedicated high-speed connection, such as a DSL connection.

The data-processing server either directly connects to the Internet, or connects to the Internet through a Web Server (not shown), to receive the data files transmitted by the computer 125. As further described below, the data-processing server converts the raw packet data that it receives to the actual amount of the dispensed liquid or to the actual status of the spout. This server then stores the generated amount or status in the database 155.

As further described below, an administrator of the establishment can then search the database to obtain various business-related reports, displays, or other information. The administrator queries this database through the application server, which communicatively couples to the administrator's computer 135 through the Internet. Like the data-processing server, the application server 150 either directly connects to the Internet, or connects to the Internet through a Web Server (not shown).

II. Free-Pour Spout

A. Physical Design.

FIGS. 2A–2H present several different views of the exterior contour of a free-pour spout used in some embodiments of the invention. In addition, FIG. 3 presents a side-cross sectional view of this spout, while FIG. 4 presents a perspective view of the top of this spout.

The bottom portion 330 of this spout is inserted into the top of a liquid container. The bottom portion includes a cork that flexes to snuggly attach the spout to the liquid container. Different size corks can also be mounted on the bottom portion in order to allow the spout to affix to liquid containers with different sized openings.

Figure 3:
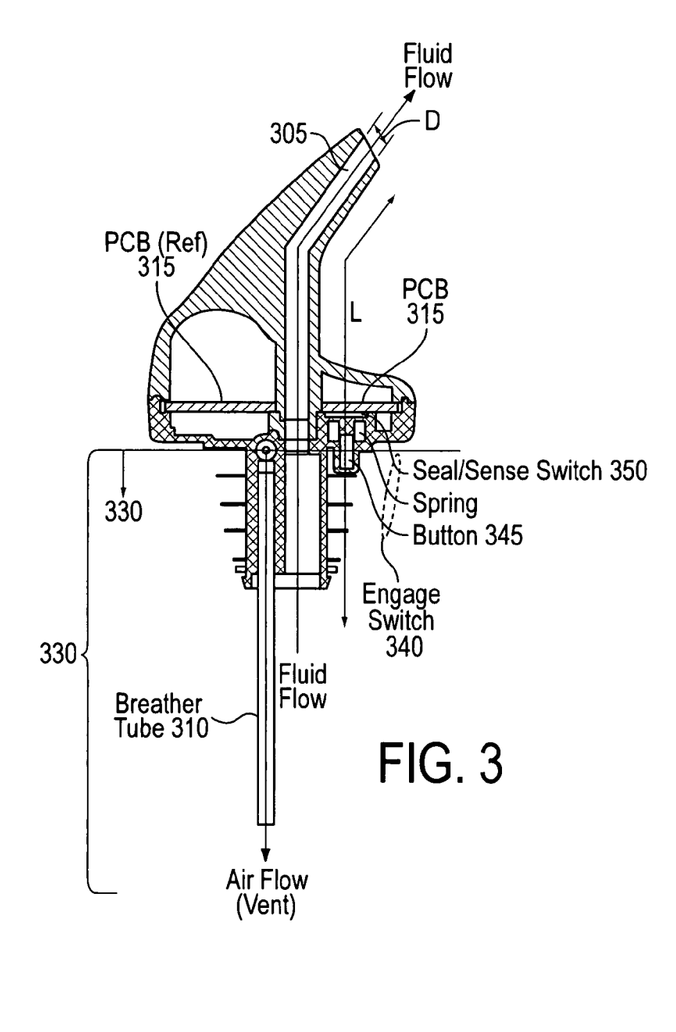
FIG. 3 presents a side-cross sectional view of the spout of FIG. 2.
Figure 4:
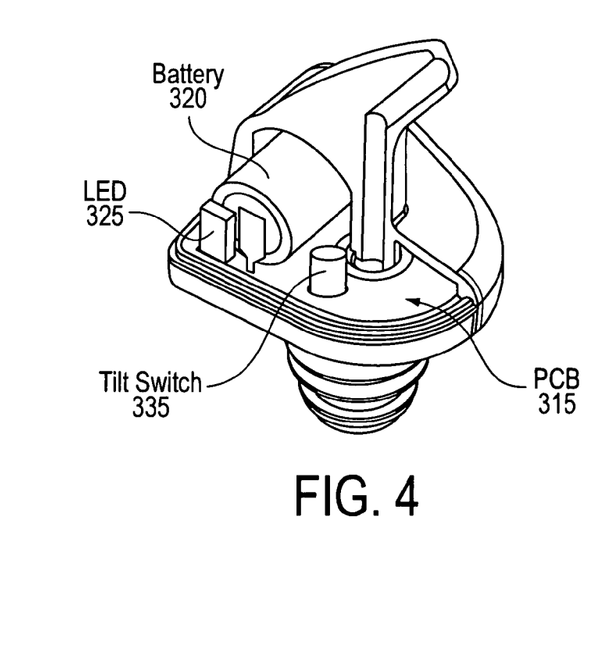
FIG. 4 presents a perspective view of the top of the spout of FIG. 2.

As shown in FIGS. 3 and 4, the spout includes a fluid-flow passageway 305, a breather tube 310, a printed circuit board ("PCB") 315 with a number of electronic components, a battery 320, an LED 325, and an engage switch 340. The dimensions of the fluid-flow passageway are specifically selected to ensure laminar fluid flow of liquid when the liquid-container and hence the spout are inclined at a certain angle (e.g., 20°) past the horizontal axis of the liquid-container. For instance, in some embodiments, the ratio (L/D) of the passageway's length (L) and width (or diameter D) is selected to be equal to or less than 20 in order to ensure laminar fluid flow.

When the spout is positioned on a liquid container, the breather tube 310 provides an air inlet that allows better fluid flow through the passageway 305. The battery 320 provides power for the electronic components of the PCB 315. The LED 325 is configured to turn on when the spout engages after it is firmly placed on a liquid container. In some embodiments, the LED can also be operated to blink when liquid is dispensed through the spout, or when the spout is removed from the liquid container.

The engage switch 340 is formed by on-off button 345 that springs up and seals a sense switch 350 on the PCB when the bottom portion 330 is inserted into a liquid container. When the bottom portion 330 is removed from the liquid container, the on-off button 345 springs back and thereby opens the sense switch 350. In some embodiments, the on-off button is pushed up by the liquid container lip that defines the container's opening. In other embodiments, this button is pushed up by another mechanism, such as the cork of the bottom portion.

B. Electronic Design

Figure 5:
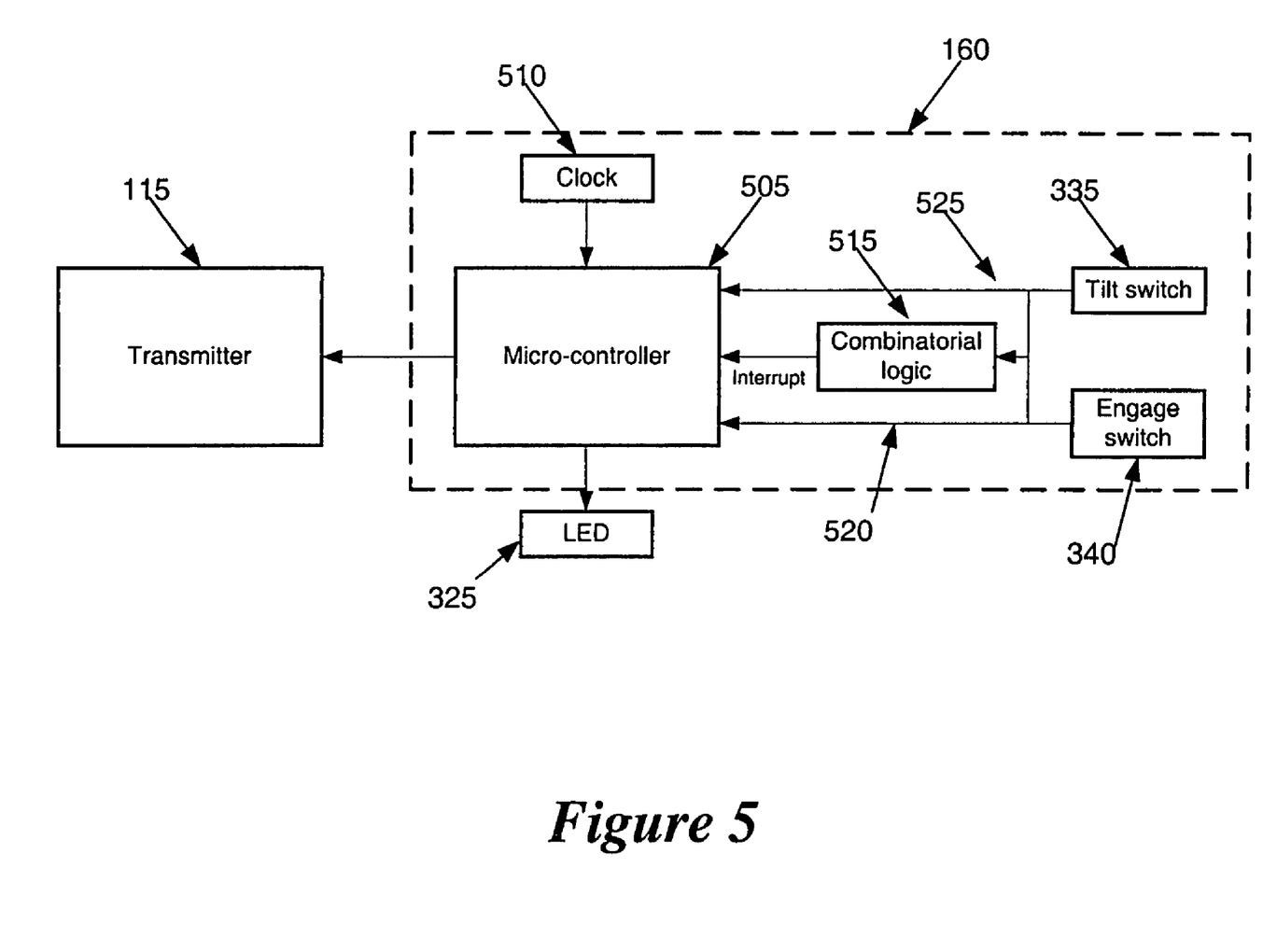
FIG. 5 illustrates a block diagram of the electronic components on a PCB of the free-pour spout of FIG. 2.

FIG. 5 illustrates a block diagram of the electronic components on the PCB 315. As shown in this figure, the PCB includes a transmitter 115 and a measuring apparatus 160. The measuring apparatus includes a tilt switch 335, an engage/disengage switch 340, combinatorial logic 515, a micro-controller 505, and a clock 510.

As mentioned above, the measuring apparatus generates three types of signals that it forwards to the transmitter 115, which, in turn, relays these signals to the receiver 120. These three signals are (1) an engage signal, (2) a disengage signal, and (3) a pour signal. The transmitter transmits each signal multiple times at random intervals, and each signal includes a data packet that contains a serial number, a sequence number, and an event identifier, as described above.

The measuring apparatus' micro-controller generates the engage signal and disengage signal respectively when the spout is placed on the liquid container and is removed from the liquid container. Specifically, when the spout is placed on or removed from the liquid container, the engage switch 340 toggles as described above.

The toggling of the engage switch toggles the signal 520 comings from the switch, and the toggling of this signal causes the combinatorial logic 515 to generate an interrupt signal that is supplied to the micro-controller 505. The interrupt signal causes the micro-controller to detect the toggling of the engage signal, and to thereby generate a signal that specifies the engage or disengage event. When the micro-controller detects that the spout has engaged a liquid container, it also activates the LED for one second or until it detects that the spout has been disengaged from the liquid container.

The micro-controller 505 generates the pour signal each time it detects a pour through the spout's passageway. Specifically, the measuring apparatus generates a pour signal whenever the micro-controller detects that the tilt switch 335 has generated an active signal (i.e., whenever the tilt switch closes) for more than a predetermined amount of time (such as 0.3 seconds). Each time the tilt switch closes, the tilt-switch signal 525 is active, and the combinatorial logic 515 generates an interrupt signal that the micro-controller receives.

When the micro-controller notices the interrupt signal, it uses a time-measuring algorithm to detect whether the tilt-switch signal remains active for more than the predetermined amount, and if so, to measure the duration of the active period. After the micro-controller measures the duration of an active period, it generates a pour signal that specifies the duration of the active period. As further described below, in some embodiments, the micro-controller measures the active-period duration by measuring several time intervals and summing the measured intervals. It should be noted that in some embodiments the micro-controller transitions to a lowered-power state each time it transmits one set of packets. The micro-controller comes out of its lowered-power state whenever it receives an interrupt signal.

C. Time-Measurement Process.

Figure 6:
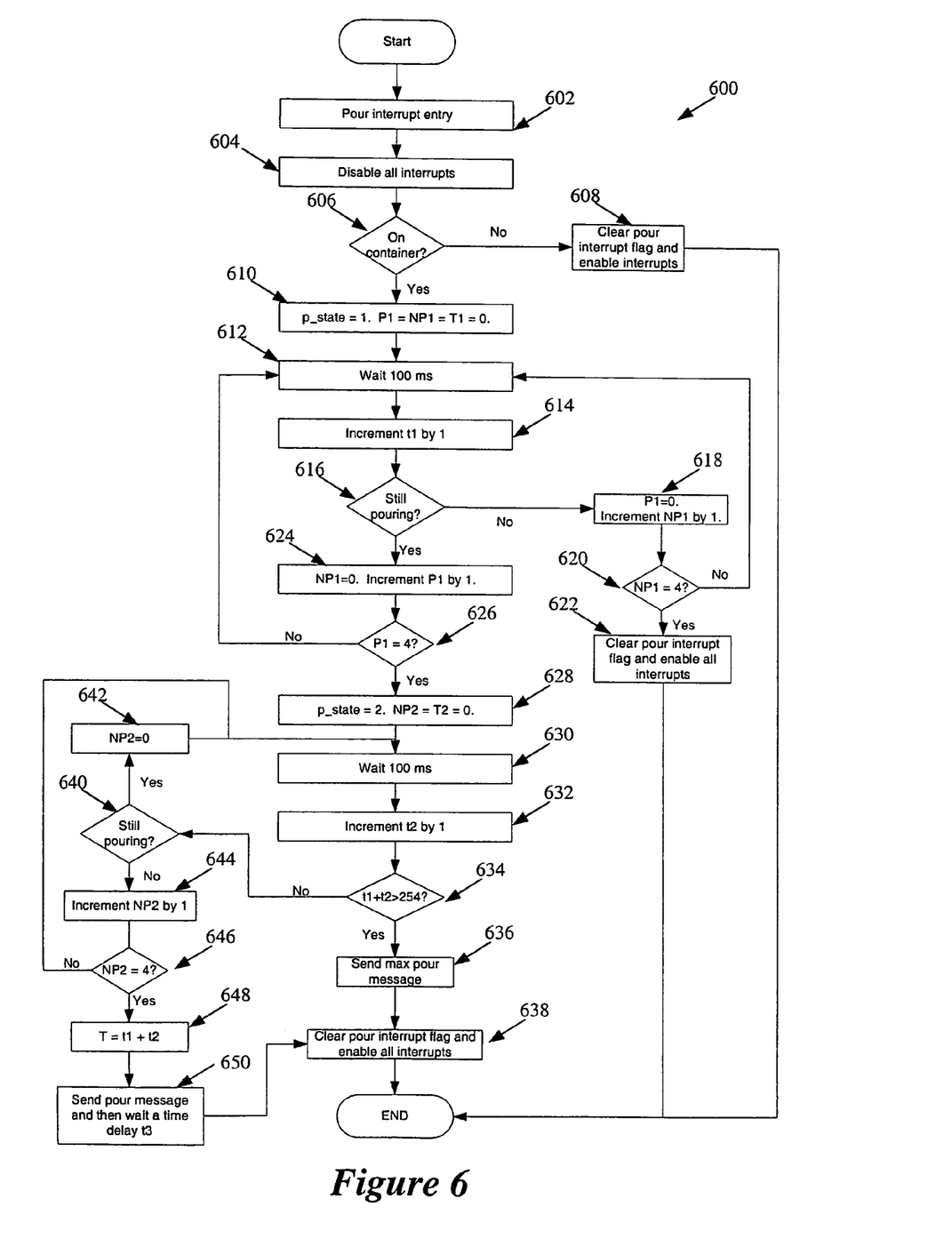
FIG. 6 illustrates a time-measurement process used by a micro-controller of the free-pour spout of FIG. 2.

FIG. 6 illustrates a time-measurement process used by the micro-controller to measure the duration of periods when the tilt switch is closed for more than a pre-specified time interval. Before explaining this process, the assumptions that were made in designing this process should first be explained.

Figure 7:
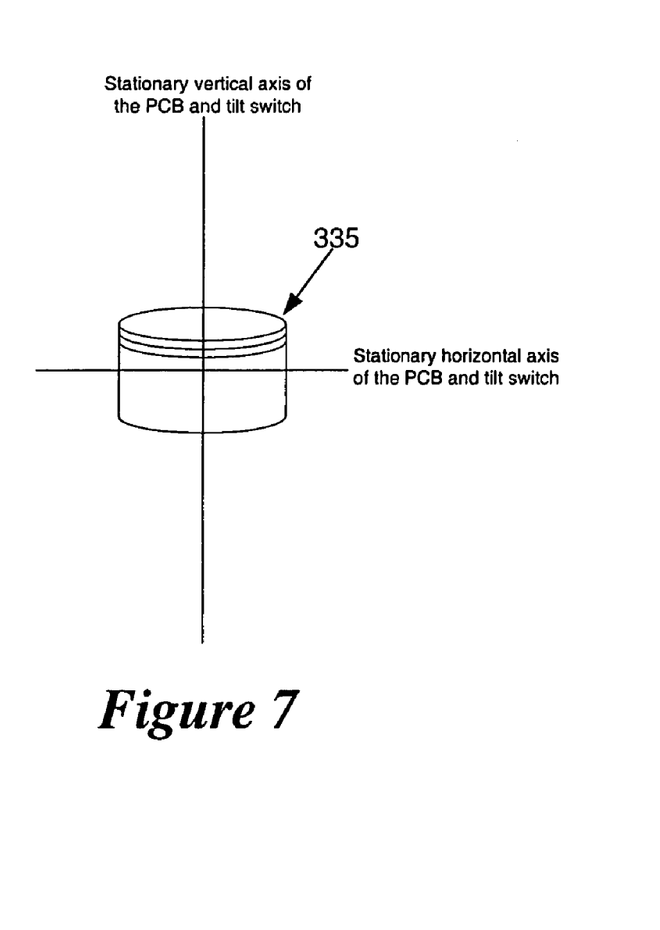
FIG. 7 illustrates the housing of the tilt switch.

In some embodiments, the tilt switch is a mercury switch that has a cylindrical housing, as shown in FIGS. 4 and 7. As shown in FIG. 7, the-central axis of this housing is vertical (i.e., is at 90°) with respect to the horizontal axis of the PCB and the spout. Given the geometric configuration and the typical length of the spout's passageway 305, fluid freely pours through the passageway when the spout's and the container's vertical axis is inclined about 20° or more below the container's stationary horizontal axis. This is demonstrated in FIG. 8. This free-fluid flow is referred to below as a "full pour" event.

However, as presented in FIG. 8, some fluid begins to pour through the spout's passageway from when the container is horizontal to when it is at −20° from the horizontal axis (i.e., from when the spout's vertical axis is parallel to the stationary horizontal axis to when the spout's vertical axis is inclined about 20° below the stationary horizontal axis). This fluid flow is referred to below as a "pour initiation" event.

Figure 8:
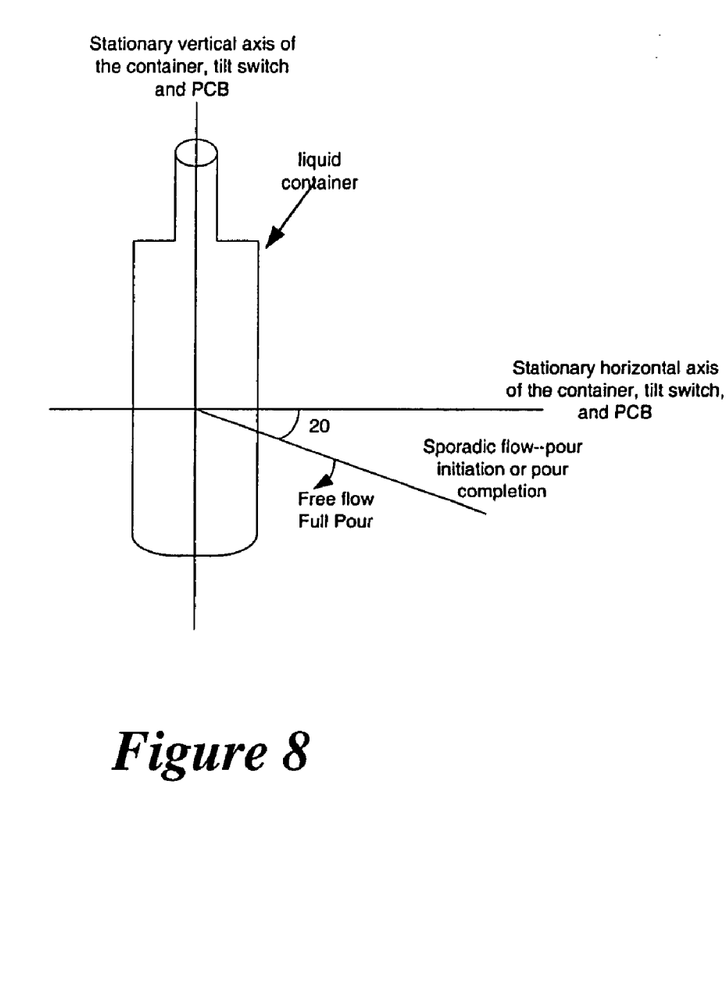
FIG. 8 pictorially illustrates the types of fluid flow for different tilting angles of the free-pour spout and the tilt switch.

Also, as presented in FIG. 8, some fluid pours through the spout's passageway as the server is terminating the pour. Specifically, some fluid pours through the passageway from when the container is about −20° from the horizontal axis to when the container is horizontal (i.e., from when the spout's vertical axis is inclined about 20° below the stationary horizontal axis to when the spout's vertical axis is parallel to the stationary horizontal axis). This fluid flow is referred to below as a "pour completion" event.

To obtain an accurate measurement of fluid flow, it is important to measure the time period for the pour initiation, pour completion, and full pour events. It is also important not to measure the duration of false pour events. False pour events occur when the tilt switch is accidentally toggled for less than a pre-specified time interval $t_f$. In the embodiments below, the pre-specified time interval is 300 milliseconds. Such accidental toggles can occur for a variety of reasons, such as the movement of the container, etc.

The time-measurement process 600 illustrated in FIG. 6 starts when it receives a hardware generated interrupt due to the tilt switch. The process then disables (at 604) all the interrupts of the micro-controller. It next determines (at 606) whether the spout is on a container (i.e., whether it has previously detected a spout engage activity and has not since detected a spout disengage activity). If the process determines that the spout is not on the container, the process clears (at 608) the pour interrupt flag and enables all the interrupts of the micro-controller. The process then ends.

Otherwise, the process defines (at 610) a pouring state variable p_state equal to 1, and sets a pouring variable P1, a non-pouring variable NP1, and a first-time-period variable t1 to 0. The process then waits (at 612) for 100 milliseconds. It then increments (at 614) the first-time period variable t1 by 1. All time-period variables used by this micro-controller measure time periods in 100 ms intervals.

Figure 9:
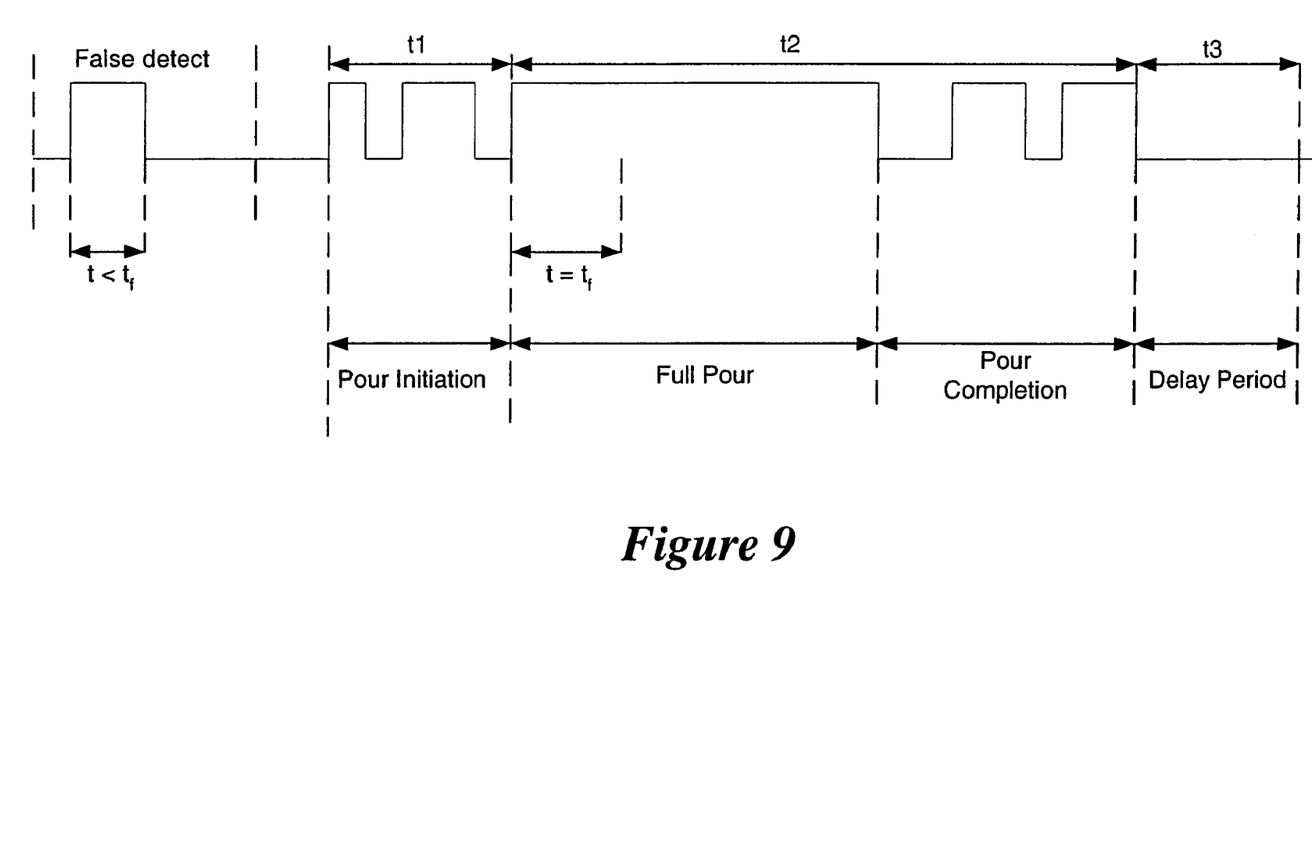
FIG. 9 presents a timing diagram that pictorially illustrates different fluid-flow periods.

After 614, the process determines (at 616) whether liquid is still pouring through the spout. The process makes this determination by examining the signal 525 from the tilt switch (i.e., by determining whether this signal is still active). If the signal from the tilt switch is no longer active, the process (at 618) increments the not-pour variable NP1 by 1 and sets the pour variable P1 to 0. The process then determines (at 620) whether the not-pour variable NP1 equals 4. If not, the process returns to 612. If so, the tilt-switch signal was a false pour detection signal, as the signal from this switch did not remain active for more than 300 milliseconds after its initial activation before going inactive for more than 300 milliseconds. One example of a false detect is illustrated in FIG. 9. When the process detects (at 620) a false pour, the process clears (at 622) the pour interrupt flag and enables all the interrupts. The process then ends.

If the process determines (at 616) that liquid is still pouring through the spout, it increments (at 624) the pour variable P1 by 1 and sets the not-pour variable NP1 to 0. The process then determines (at 626) whether the pour variable P1 equals 4. If not, the process returns to 612. If so, the initial tilt-switch signal was the start of a pour initiation process as the signal from this switch remained active for more than 300 milliseconds after its initial activation without going inactive for more than 300 milliseconds. The time period t1 measured until now represents the duration of the pour initiation period. One example of the pour-initiation period is illustrated in FIG. 9. When the process detects (at 626) a pour-initiation period, the process defines (at 628) the pouring state p_state equal to 2, and sets a non-pouring variable NP2 and a second-time-period variable t2 to 0. The process then waits (at 630) for 100 milliseconds. It then increments (at 632) the second-time period variable t2 by 1.

Next, the process determines (at 634) whether the sum of t1 and t2 is greater than 254. If so, the process has detected a maximum pour operation. Hence, at 636, it sends a max_pour message signal. It then clears (at 638) the pour interrupt flag and enables all the interrupts. The process then ends.

On the other hand, if the process determines (at 634) that the sum of t1 and t2 is not greater than 254, it determines (at 640) whether liquid is still pouring through the spout. If so, it sets (at 642) the not-pour variable NP2 to 0, and then returns to 630. Otherwise, the process increments (at 644) the not-pour variable NP2 by 1. The process then determines (at 646) whether the not-pour variable NP2 equals 4. If so, the full pour and pour completion operations have been completed, as the signal from the tilt switch has been inactive for more than 300 milliseconds. Examples of full pour and pour completion periods are illustrated in FIG. 9.

When the process detects (at 646) the completion of the full pour and pour completion operations, the process adds (at 648) the first and second time periods t1 and t2. The process then sends a pour signal to the transmitter. This pour signal includes the added value (i.e., the sum of t1 and t2), in addition to the serial and sequence numbers as described above. In some embodiments, the process transmits each signal multiple times in order to ensure that the receiver receives the signals. After transmitting each set of packets, the process waits for a time out period t3, and then clears (at 638) the pour interrupt flag and enables all the interrupts. The process then ends.

Even though the process 600 generates the pouring-interval signal by adding t1 and t2, other embodiments generate this amount by measuring several time intervals, weighting the measured time intervals, and summing the weighted intervals. These embodiments weight the time intervals in order to account for different fluid flow during those intervals.

D. Engage and Disengage Signals.

As discussed above, in addition to the pour signal, the micro-controller also sends engage and disengage signals to the transmitter 115 for transmission to the receiver 120. The micro-controller sends the engage signal whenever it receives an interrupt due to the activation of the engage signal. The micro-controller sends a disengage signal whenever it receives an interrupt due to the deactivation of the engage signal. Like the pour signal, the engage and disengage signals include the serial and sequence numbers as described above.

III. Receiver and Computer

The transmitter transmits each signal that it receives from the micro-controller to the receiver. The transmitter transmits each signal multiple times at random intervals in order to ensure reliable reception. The receiver can be configured by purchasing off-the-shelf components.

As discussed above, the firmware of the receiver is designed to forward each packet that it receives from the transmitters 115 to the computer 125 through the RS-232 link, and to use a look-up table to discard duplicate copies of the same packets that it receives. Specifically, the receiver (1) stores in a table the serial number and sequence number of each packet that it forwards to the computer, and (2) discards the received packets that have serial and sequence numbers that match serial and sequence numbers recorded in the table. The table is a FIFO table; hence, when it fills up, the first entry in the table is deleted in order to record the next entry.

The computer stores the packets that it receives from the receiver in a data file. The computer can be a typical personal computer, workstation, or server. In some embodiments, this computer is a data-collecting "brick" with minimal or no interactions with individuals at the establishment. At pre-specified intervals (e.g., every five minutes), the computer sends through the Internet the data file with the collected packet to the data processing server 145. The transmitted data file identifies the establishment from which the data was collected. In some embodiments, the computer 125 connects to the Internet through a dedicated high-speed connection, such as a DSL connection.

IV. Data Processing Server

Figure 10:
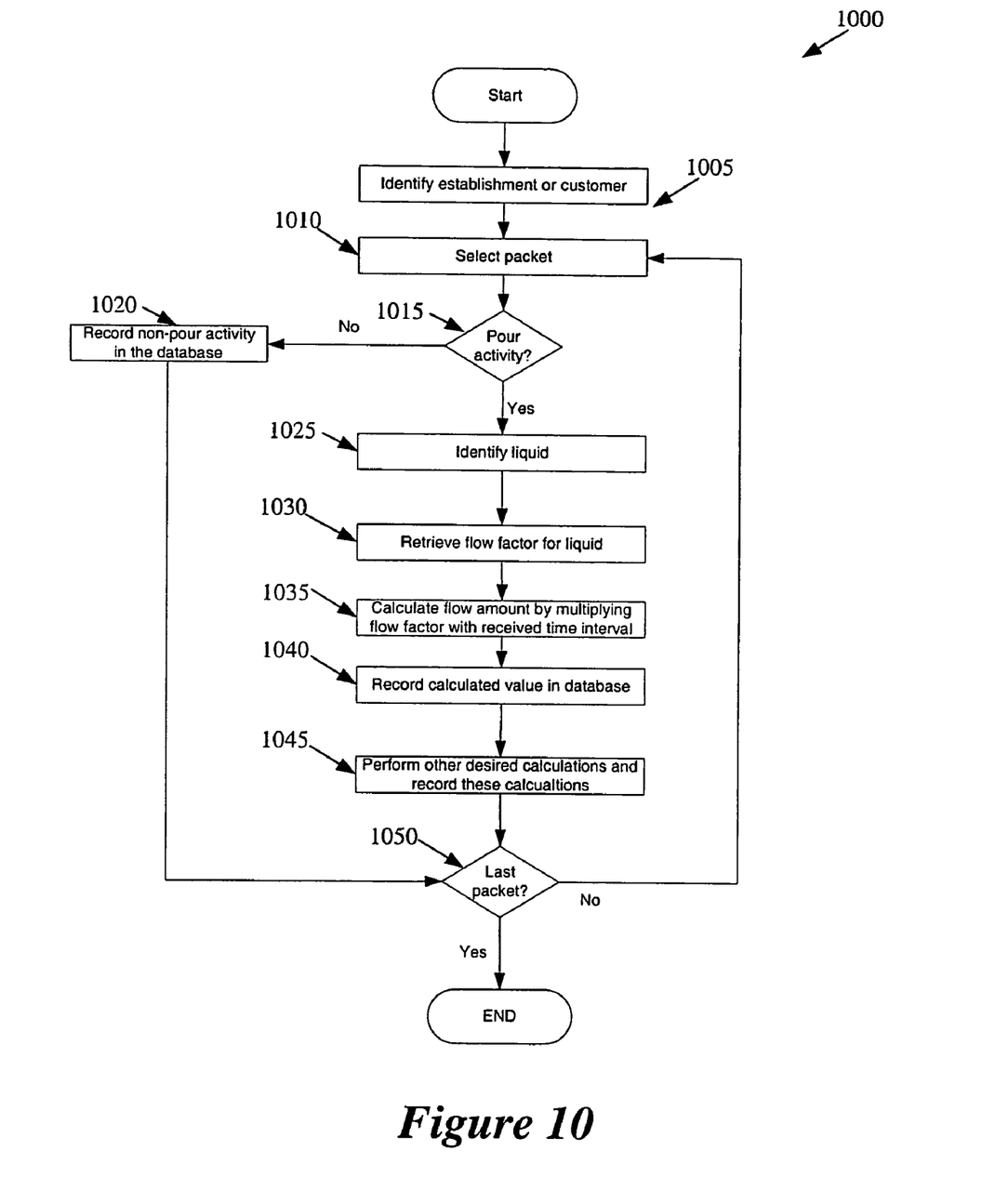
FIG. 10 illustrates a process that a data processing server performs to convert the raw packet data that it receives to the actual amount of the dispensed liquid or to the actual status of the spout.

FIG. 10 illustrates a process 1000 that the data processing server performs to convert the raw packet data that it receives to the actual amount of the dispensed liquid or to the actual status of the spout. This process starts each time the data processing server wants to process a file that it receives from a computer 125 of an establishment 105.

Initially, this process 1000 identifies (at 1005) the establishment and/or customer from which it received the file. In some embodiments, the file contains an identifier specific to the establishment and/or customer that sent the file. The server retrieves this identifier from the file, and uses this identifier to retrieve from the database the identity of the originating establishment and/or customer.

The received file contains one or more raw data packets. Hence, the process selects a raw data packet (at 1010) from the file. The process then determines (at 1015) whether the packet relates to a pour activity by examining the event field of this packet. If not, the packet relates to an engage or disengage activity. Hence, at 1020, the process records the engage or disengage activity in the database, and then terminates. The process records the engagement and disengagement of the spout in order to allow an administrator to detect any unauthorized engagements, disengagements, pourings, or cheatings by the employees of the establishment.

On the other hand, if the packet relates to a pour activity, the process identifies (at 1025) the liquid associated with the pour from the serial number contained in the packet. As mentioned above, the serial number provides the identity of a spout, which through a particular database table for the identified customer and/or establishment is mapped to a particular type of liquid (e.g., to a particular liquor brand).

Next, the process retrieves (at 1030) from the database the flow factor associated with the identified liquid. The process then calculates (at 1035) the flow amount by multiplying the flow factor with the time interval stored in the packet. The process then records (at 1040) the calculated value in the database.

Some embodiments of the invention perform other calculations at this point based on the flow amount computed at 1035. These computations can include the cost associated with the computed amount, the sale value of this amount, the expected profit on this sale, the remaining inventory of the identified liquid, etc. These calculations can be performed, and the resulting values can be recorded in one or more database tables, at 1045.

The process determines (at 1050) whether it has examined all the packets in the received file. If not, the process returns to 1010 to select another packet, and repeat 1015-1045 for the next packet. Otherwise, the process ends.

V. Application Server

An administrator of the establishment can search the database 155 to obtain various business-related reports, displays, or other information. As mentioned above, the administrator queries this database through the application server, which communicatively couples to the administrator's computer 135 through the Internet. Examples of analysis reports that the administrator can generate include reports relating to sales, inventory depletion, cost of goods sold, and pouring cost calculations.

To generate such reports, the administrator initially supplies a customer identification and/or password. The application server then checks the supplied information to qualify the administrator to query the database. The administrator can then query the database to generate any number of reports, such as those mentioned above. The administrator typically generates such reports by selecting the type of report that he or she wishes to see and providing a time frame for the report.

In some embodiments, the application server generates the reports by retrieving data from the database and performing calculations based on the retrieved data. It should be noted that some or all of the computations necessary from some of the reports might be pre-computed by the data processing server at 1045 of process 1000.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is the claimed is:

1. An apparatus for measuring the amount of liquid poured from a liquid container, the apparatus comprising:
   a. a tilt switch for detecting a tilting of the liquid container by at least a tilting angle; and
   b. at least one electronic component that generates a time measurement when the liquid container remains tilted by at least the tilting angle.

2. The apparatus of claim 1 further comprising a passageway that includes a plurality of dimensional attributes that ensure laminar fluid flow through the passageway when the apparatus is rotated by the tilting angle.

3. The apparatus of claim 2, wherein the dimensional attributes of the passageway further ensure laminar fluid flow when the apparatus is rotated by a second tilting angle.

4. The apparatus of claim 2, wherein the passageway has a length and a diameter, and the ratio of the length and the diameter is no more than a particular value.

5. The apparatus of claim 1 further comprising:
   a. a passageway; and
   b. a breather tube for providing an air inlet that allows better fluid flow through the passageway.

6. The apparatus of claim 1 further comprising an engage switch for determining whether the apparatus is physically coupled to the liquid container.

7. The apparatus of claim 6 further comprising a combinational logic for determining when the engage switch and the tilt switch are activated.

8. The apparatus of claim 7, wherein the combinational logic is further for generating an interrupt signal to the electronic component when the engage switch and the tilt switch are activated.

9. The apparatus of claim 8, wherein a time measurement is generated when the electronic component receives the interrupt signal from the combinational logic.

10. The apparatus of claim 1 further comprising a transmitter for transmitting data to at least one receiver.

11. The apparatus of claim 10, wherein the transmitted data comprises the time measurement.

12. The apparatus of claim 10, wherein the transmitted data is transmitted more than once.

13. The apparatus of claim 10, wherein the transmitted data is transmitted more than once at random intervals.

14. The apparatus of claim 1, wherein the time measurement comprises a plurality of time interval measurements.

15. The apparatus of claim 14, wherein the time interval measurements comprises a time interval measurement in a range that includes 100 milliseconds.

16. The apparatus of claim 14, wherein the time interval measurements are weighted time interval measurements.

17. The apparatus of claim 1, wherein the electronic component is further for determining whether a false pout event occurred.

18. The apparatus of claim 17, wherein the time measurement is not generated after determining that the false pour event occurred.

19. The apparatus of claim 1, wherein the apparatus is part of a spout.

20. The apparatus of claim 1, wherein the apparatus is physically coupled to the liquid container.

21. The apparatus of claim 1, wherein the time measurement represents an estimate of the time that liquid flows from the liquid container.

22. The apparatus of claim 1, wherein the electronic component comprises at least two power states.

23. The apparatus of claim 22, wherein the electronic component is in a lowered power state when the electronic component does not receive an interrupt signal from a combination logic.

24. The apparatus of claim 22, wherein the electronic component is in a higher power state when the electronic component receives an interrupt signal from a combination logic.

25. The apparatus of claim 1, wherein the tilt switch comprises a mercury switch.

26. The apparatus of claim 1, wherein the electronic component is for determining whether a maximum pour has occurred.

27. The apparatus of claim 26, wherein the maximum pour has occurred if a liquid container remains tilted by the tilting angle for a particular time.

28. The apparatus of claim 1, wherein the apparatus is used in a free-pour system.

29. The apparatus of claim 1, wherein the electronic component comprises a micro-controller.

30. The apparatus of claim 1, wherein the electronic component comprises a clock.

31. The apparatus of claim 1, wherein the electronic component comprises a combinational logic.

32. The apparatus of claim 1, wherein the tilt switch and the electronic component are coupled to a PCB.

* * * * *